United States Patent [19]
Beckens

[11] 3,808,786
[45] May 7, 1974

[54] FRUIT HARVESTING APPARATUS

[76] Inventor: Alfred Beckens, Fish Farm Rd., Sodus, N.Y. 14551

[22] Filed: Apr. 13, 1973

[21] Appl. No.: 350,770

[52] U.S. Cl. ............................................. 56/329
[51] Int. Cl. ........................................... A01g 19/00
[58] Field of Search ..................... 56/328, 329, 181

[56] References Cited
UNITED STATES PATENTS

| | | | |
|---|---|---|---|
| 3,535,864 | 10/1970 | Smith | 56/329 |
| 3,511,039 | 5/1970 | Gould et al. | 56/329 |
| 3,531,925 | 10/1970 | Vines et al. | 56/329 |
| 2,509,371 | 5/1950 | Schroeppel | 56/23 |
| 3,214,002 | 10/1965 | Kirkpatrick et al. | 56/181 X |

*Primary Examiner*—Russell R. Kinsey
*Attorney, Agent, or Firm*—Denson and Kurtzman

[57] ABSTRACT

A novel fruit harvesting apparatus is described. The apparatus includes an elongated framework, a shaker, a conveyor, a deflector, a conveyor elevator and a flexible drape which can be extended on the ground under the tree to be harvested. After fruit is shaken from the tree and deposited on the extended drape, the drape is rolled onto a roller supported on the elongated framework. As the drape is rolled onto the roller, fruit disposed therein is discharged onto a deflector and thereafter onto the conveyor. The deflector "breaks" the fall of the fruit thereby reducing the possibility of bruising, and the conveyor transports the fruit to a receptacle. The discharge end of the conveyor is elevatable so that the receptacle can be placed thereunder. By placing the receptacle in close proximity to the discharge end of the conveyor, the possibility of fruit bruising is further reduced. Specific inventive details and advantages are described hereafter.

18 Claims, 4 Drawing Figures

FRUIT HARVESTING APPARATUS

BACKGROUND OF THE INVENTION

This invention relates to a novel fruit harvesting apparatus.

Traditionally, the fruit crop born by trees has been harvested by hand. Recently, however, hand harvesting has been gradually replaced by various types of machine harvesting devices. Most devices employ some type of shaker for shaking fruit from a tree. After the fruit is deposited on the ground, the crop may be retrieved by hand and placed in a receptacle for shipping or storage.

In other devices, the fruit is shaken onto a drape extended about the base of the tree on the ground. Thereafter, the fruit is deposited onto a conveyor which transports the fruit to a receptacle. A primary disadvantage in this operation is that frequently, the fruit becomes bruised as it is transferred from the drape to the conveyor or as it is transferred from the conveyor to a receptacle. Most bruising is caused during free fall of the fruit in one of these transfer processes by impact of individual fruit pieces with each other or with foreign objects such as the receptacle or conveyor surface. Frequently, the conveyor surface itself contains metal links on the end as part of the drive system which engage a drive sprocket for imparting motion to the conveyor belt. The impact of fruit pieces with these metallic components can cause bruising as well.

Fruit bruising is undesirable since such fruit has a tendency to rot at an accelerated pace. Not only is bruised fruit unacceptable at the market place, but may also be detrimental to fruit with which it is stored, i.e., when the bruised fruit rots, it may cause healthy fruit to rot, making an entire inventory marketably unacceptable.

The receptacle for the fruit may be a box, a bin, a truck or any other type of container suitable for shipping or storing fruit. In order to reduce the possibility of bruising, the discharge distance (i.e., the distance between the end of the conveyor from which the fruit is discharged and the receptacle) should be minimized to lessen the impact of the fruit. Unfortunately, most harvesting machines have no means for controlling this distance. The discharge distance can be reduced by using a forklift to raise the fruit receptacle into close proximity with the discharge end of the conveyor. However, the use of a forklift in this capacity is necessarily limited in that the receptacle must be a box. Also, when a forklift is used, the dimensions of the box employed are an additional limitation which further reduces the flexibility of the harvesting operation.

Generally, the more versatile harvesting machines have a large number of moving parts and thus are subject to frequent repairs. This is particularly notable in machines having sprocket driven conveyor belts.

OBJECTS OF THE INVENTION

It is an object of this invention to provide a novel fruit harvesting apparatus.

It is another object of this invention to provide a fruit harvesting apparatus which reduces the possibility of fruit bruising.

A further object of this invention is to provide a novel means for transporting harvested fruit to a receptacle.

Yet another object of this invention is to provide a fruit harvesting apparatus which is relatively economical to manufacture and simple to operate.

These and other objects are accomplished with the novel fruit harvesting apparatus described herein. The apparatus includes an elongated framework, a shaker, a conveyor, a deflector, a conveyor elevator and a flexible drape which can be extended on the ground under the tree to be harvested. After fruit is shaken from the tree and deposited on the extended drape, the drape is rolled onto a roller supported on the elongated framework. As the drape is rolled onto the roller, fruit disposed thereon is discharged onto a deflector and thereafter onto the conveyor. The deflector "breaks" the fall of the fruit thereby reducing the possibility of bruising, and the conveyor transports the fruit to a receptacle. The discharge end of the conveyor is elevatable so that the receptacle can be placed thereunder. By placing the receptacle in close proximity to the discharge end of the conveyor, the possibility of fruit bruising is further reduced. Specific inventive details and advantages are described hereafter.

DETAILED DESCRIPTION OF THE INVENTION

Figure 1:
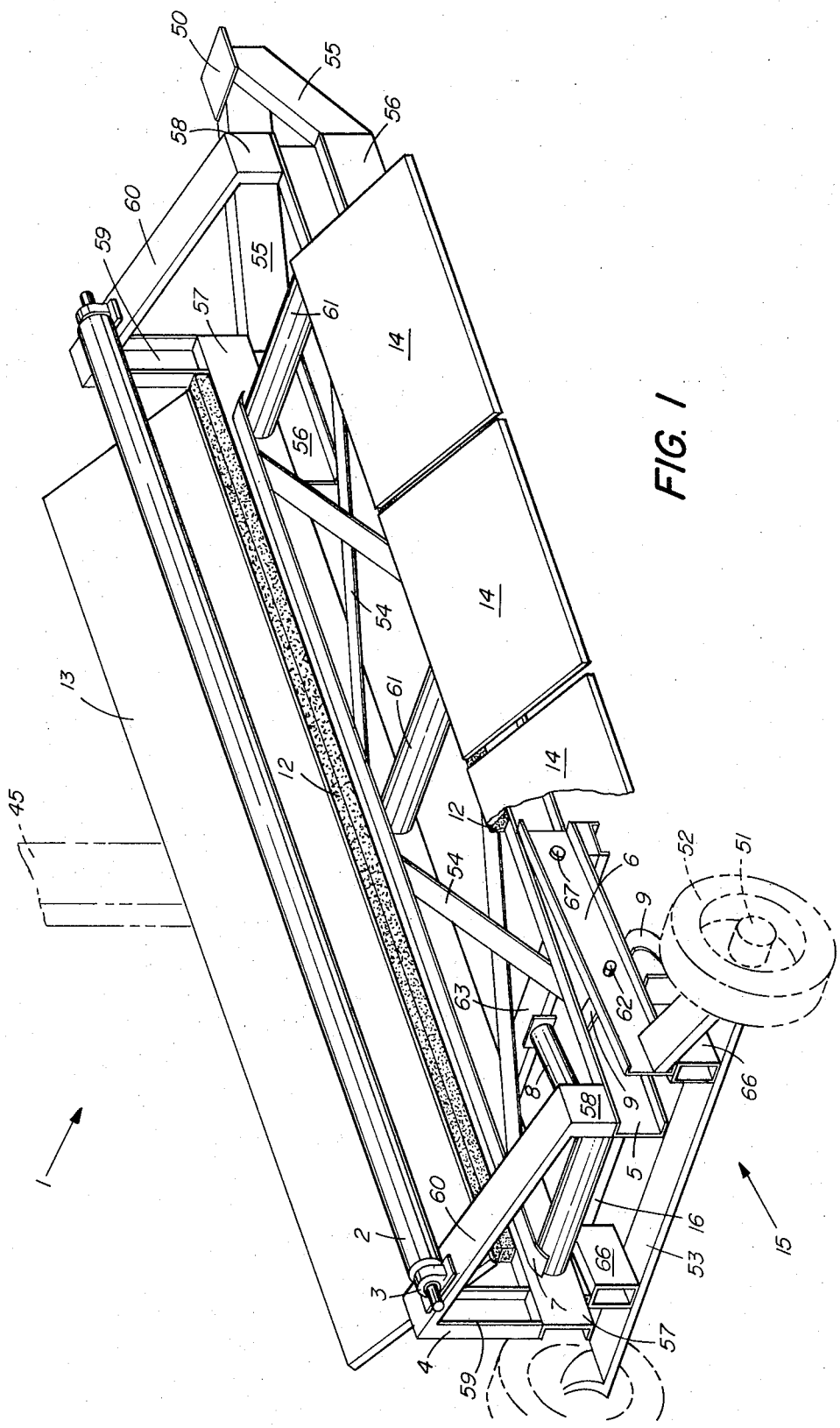
FIG. 1 is an overall view in perspective of the framework of the novel fruit harvester of this invention.

Framework assembly 1 of FIG. 1 includes a hitch assembly for attaching the forward end of framework assembly 1 to a towing vehicle such as a tractor. Hitch support members 55 support hitch 50 and are also attached to hitch connecting member 56. Any type of hitch associated with farm towing equipment can be employed as hitch 50. Connecting members 56 connect the hitch assembly members to the forward ends of support channels 5 and 57 of framework assembly 1.

The rear of framework assembly 1 is supported by wheel assembly 15 which includes axle member 51 with wheels 52 mounted thereon. Wheel assembly cross-support member 53 is situated between wheels 52 and connects the wheels together. Support blocks 66 are situated on top of cross-support member 53 and support the rear ends of support channels 5 and 57 as well as the rear ends of elevation support members 6.

Extending the length of framework assembly 1 are two parallel framework assembly support channels 5 and 57. Framework assembly cross-support members 54 are attached to support channels 5 and 57 by any suitable means such as welding.

Short vertical support members 58 are positioned at each end of support channel 5, and long vertical support members 59 are positioned at each end of support channel 57. Long vertical support members 59 are of greater length than short vertical support members 58. Diagonally disposed support members 60 are attached to the upper ends of vertical support members 58 and 59 thus forming a framework for supporting roll support member 2. Roll support member 2 is rotatably mounted on diagonally disposed support members 60 by roller bearings contained in roller bearing housing 3.

A conveyor assembly having conveyor rollers 61 supporting a conveyor belt is disposed between and supported by framework assembly support channels 57 and 5.

The conveyor elevating assembly includes elevation support members 6 pivotally attached to framework assembly support channels 5 and 57 by pin 67. Elevation cross-support member 63 is situated transverse and attached to elevation support members 6. One end of an elevation means such as hydraulic cylinder 8 is attached to elevation cross-support member 63. The remaining end of cylinder 8 is attached to an elevation bracket (not shown). In operation, actuation of hydraulic cylinder 8 causes elevation of the entire rear portion of the conveyor assembly.

Drape support means 14 is attached to framework assembly support channel 5 in a manner wherein an inclined planar surface is provided for a drape to be more easily moved from the ground around roll support member 2. Drape support means 14 extends from its point of attachment to framework assembly support channel 5 diagonally to a point either on the ground or immediately adjacent to the ground. Support means 14 may optionally be padded with a resilient material such as foam rubber.

A diagonally disposed deflector 13 is situated on the back portion of framework assembly 1 and is attached to framework assembly support channel 57. A strip of resilient material 12 such as foam rubber is disposed at the base of deflector 13. Deflector 13 may also optionally be padded. Shaker beam 45, also attached to framework assembly support channel 57, supports a shaker assembly (not shown).

Figure 2:
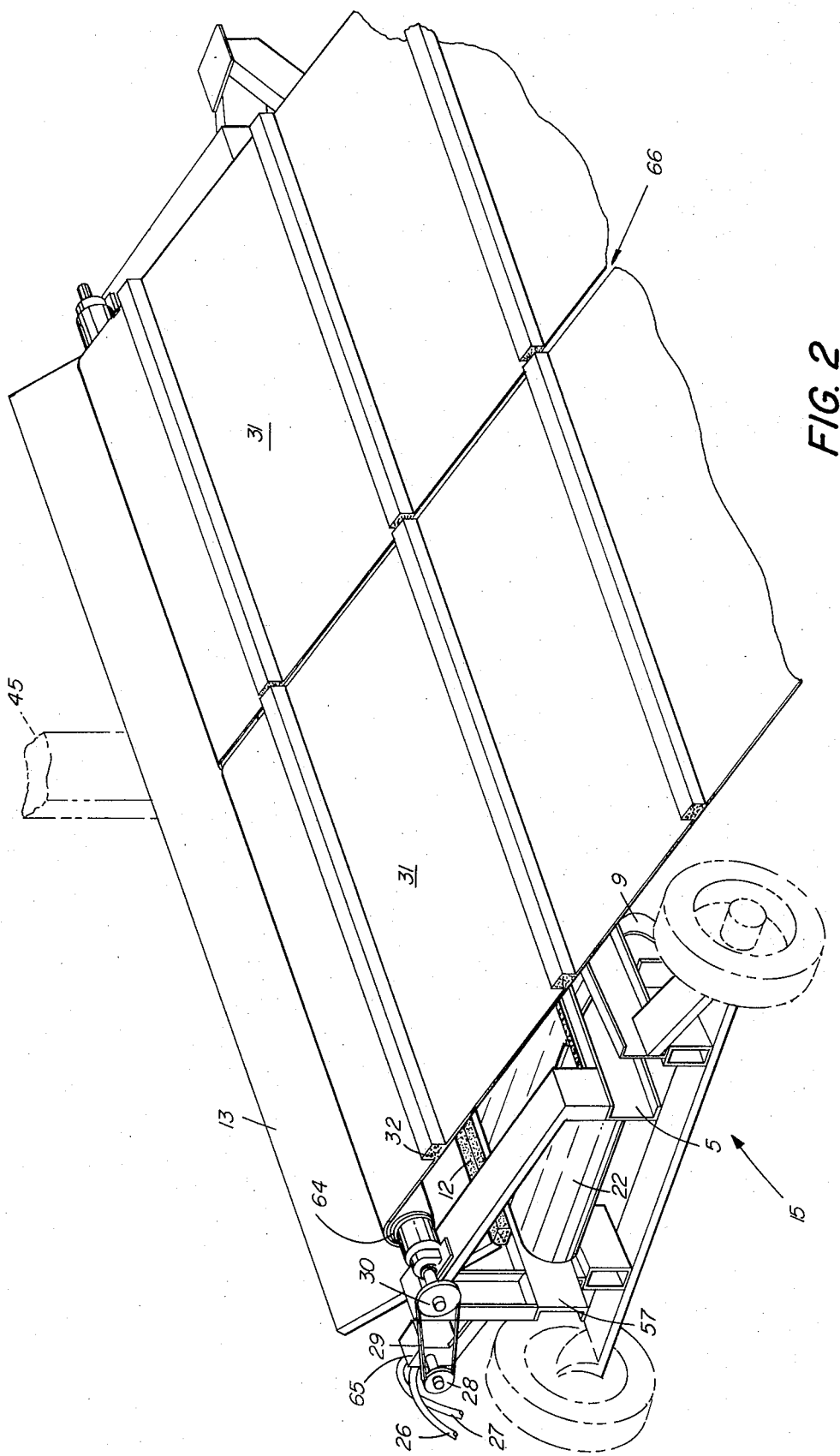
FIG. 2 is an overall view in perspective of the fruit harvesting apparatus of this invention showing the drape in its extended position.

In FIG. 2, drape 31 is shown in its extended position. Drape 31 is suitably made of any flexible material which is durable and rollable. Typical materials include canvas, polymeric materials and various other types of cloth, etc. A series of longitudinally disposed parallel cleats 32 are positioned on the surface of drape 31. Cleats 32 are suitably comprised of a loop of drape material containing a resilient material such as foam rubber. Cleats 32 function to hold the fruit shaken from a tree in place as drape 31 is rolled onto drape roll 64. Drape 31 is wound onto drape roll 64 by rotational movement of roll support member 2. Roll support member 2 is driven by sheave 30 which is connected to motor 65 by drive sheave 28 and chain 29.

Figure 3:
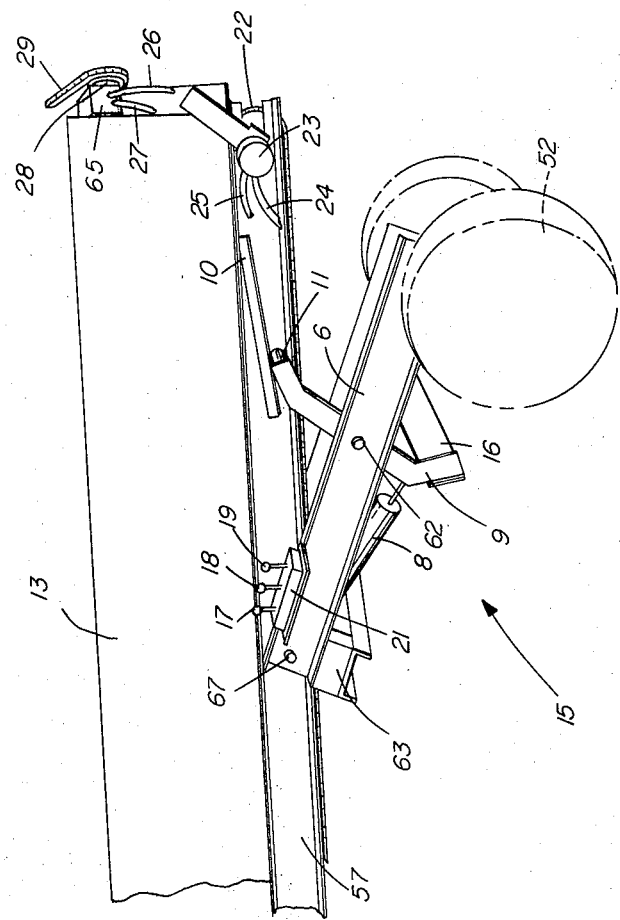
FIG. 3 is a rear perspective view of the conveyor elevation assembly in conjunction with the framework of fruit harvesting apparatus.

In FIG. 3, conveyor elevation assembly is elevated by activation of hydraulic cylinder 8. Elevation support members 6 are pivotally attached to frame assembly support channels 57 and 5 (not shown) by pin 67. Elevation cross-support member 63 is situated transverse and attached to each of elevation support members 6. One end of hydraulic cylinder 8 is attached to elevation cross-support member 63 while the remaining end is hingedly connected to cylinder bracket support 16. Bracket extensions 9 are affixed to either end of bracket support 16. Attached to the end of bracket extensions 9 are rollers 11 which are also situated tangentially adjacent to elevation ramp guide 10. Bracket extensions 9 are also pivotally affixed to elevation support member 6 by pin 62. Expansion of cylinder 8 causes rearward movement of cylinder bracket support 16 and rotation of extensions 9 about pins 62. Ramp 10 is fixedly attached to framework support channel 57. Roller 11 moves forwardly along ramp 10 thereby causing elevation of the conveyor assembly. Lines 24 and 25 supply and remove fluid to and from hydraulic motor 23 which powers conveyor 22. Likewise, lines 26 and 27 supply and remove fluid to and from hydraulic motor 65 which powers roll support member 2. Hydraulic control box 21 contains controls 17, 18 and 19 for activating roll support drive motor 65, cylinder 8 and conveyor drive motor 23, respectively.

Figure 4:
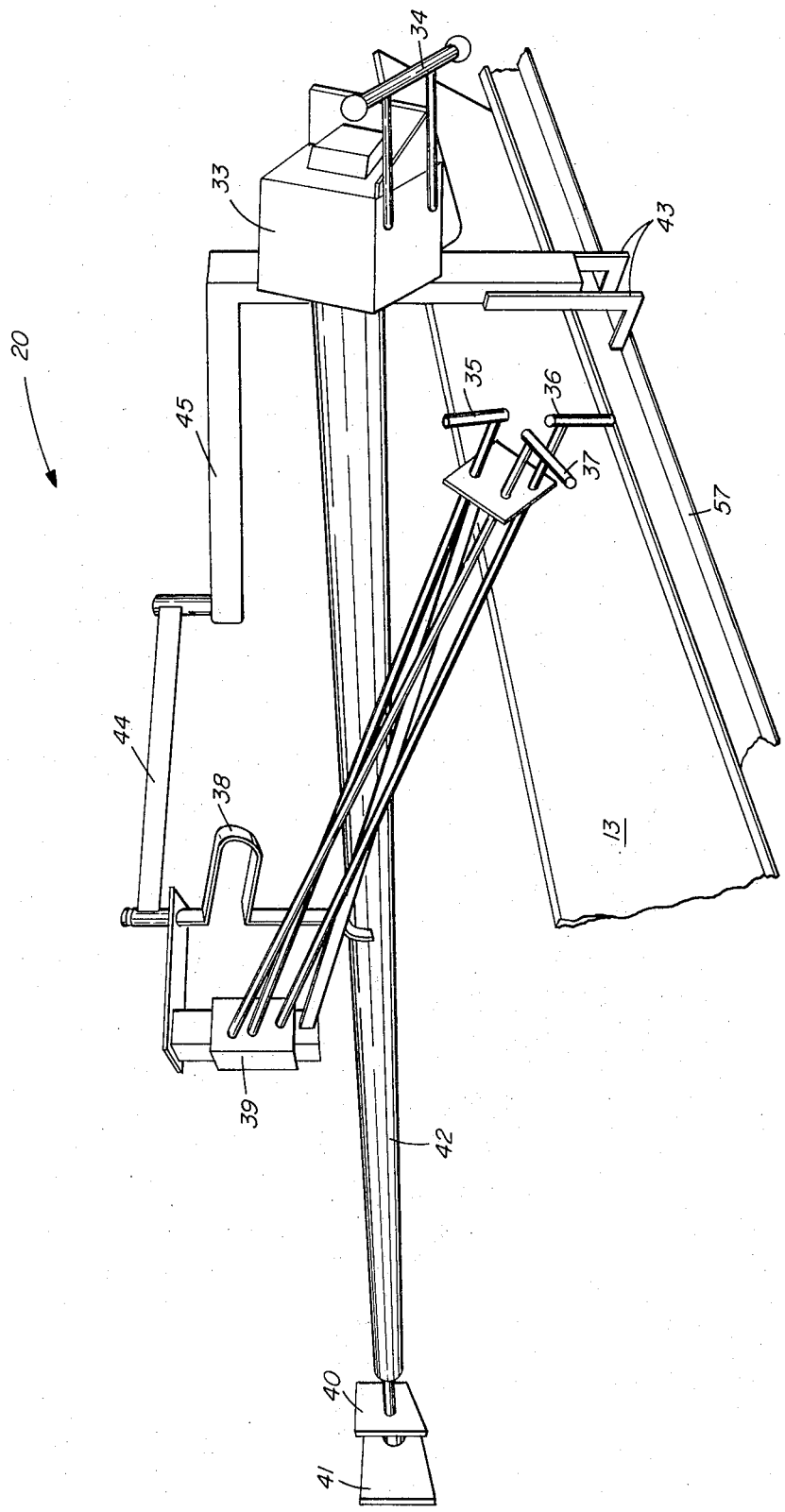
FIG. 4 is a perspective view of the shaker assembly used in conjunction with the novel fruit harvesting apparatus described herein.

Any of several known types of tree shakers can be used in conjunction with the fruit harvesting apparatus described herein. FIG. 4 depicts a typical tree shaker useful in this invention. Shaker assembly 20 is suitably affixed to framework assembly support channel 57 by L support members 43 and shaker beam 45. Shaker jaws 40 and 41 are affixed to one end of shaker arm 42 and are used to firmly grip the limb or trunk of the tree to be harvested. The remaining end of shaker arm 42 is pivotally attached to shaker beam 45. Handle 34 is employed to pivotally swing shaker arm 42 into the desired position. Controls 35, 36 and 37 actuate a hydraulic motor contained in housing 39 thereby respectively causing either an opening and closing of jaws 40 and 41, a reciprocal shaking motion of shaker arm 42 or a lateral in and out movement of shaker assembly 20.

In operation, the fruit harvesting apparatus is towed into position in close proximity to the tree to be harvested. Thereafter, drape 31 is unrolled and extended about the base of the tree. Positioning of drape 31 is facilitated by slot 66 which permits portions of the drape to be extended completely about the trunk of the tree. For exceptionally large trees, the entire drape may be extended along one side of the tree only and after one side of the tree is harvested, the drape may be extended along the other side of the tree while it is harvested.

Drape 31 can be unrolled manually or by power. In its final extended position, it rests on inclined planar surfaces 14 which assist in supporting the fruit ladened drape as it is retracted onto drape roll 64.

After the apparatus is positioned, clamping jaws 40 and 41 of shaker 20 are firmly affixed to the limb or trunk of the tree to be harvested. Control 35 actuates the hydraulic system in communication with clamping jaws 40 and 41 thereby causing a closing or opening motion. Activation of shaker control 36 causes the tree to be shaken. The intensity of the shaking action causes fruit to fall from the tree onto the drape positioned about the tree.

Upon completion of the shaking operation, the fruit is then transported to storage bins. The transportation is accomplished by engaging motor 23 which drives conveyor belt 22.

Fruit bearing drape 31 is retracted about roll support 2 by engaging motor 65 which powers drive sheave 28, chain 29 and sheave 30 thereby forming drape roll 64. As drape 31 is being drawn toward the harvester, cleats 32 assist in preventing movement of the crop. Also, inclined planar surfaces 14 assist in guiding the direction of travel of drape 31 onto roll support 2 and roll 64.

If the fruit carried on drape 31 is discharged directly onto conveyor 22, a good portion of the fruit on the conveyor will most likely be bruised by its impact with the other fruit falling off of the drape roll. In order to assist in reducing the possibility of the fruit pieces being bruised in this manner, roll support member 2 is positioned so that fruit carried on drape 31 is discharged onto diagonally disposed deflector 13. Instead of roll support member 2 being centered on support member 60, it is positioned to the rear thereof. This position insures that the fruit will be discharged onto the deflector instead of directly onto the conveyor. The deflector "breaks" the fall of the fruit discharged from drape 31, i.e., it reduces the free fall distance of the fruit. By reducing the free fall distance to a minimum, the momentum of the falling fruit is substantially reduced. This reduction in momentum causes a corresponding decrease in impact force at the end of the free fall thereby greatly lessening the possibility of bruising by impact. After the fruit contacts deflector 13, it then rolls down the inclined surface of deflector 13 and onto the surface of conveyor 22. Padding contained on the surface of deflector 13 provides additional cushioning to assists in eliminating fruit bruising.

Conveyor 22 transports the harvested fruit to a receptacle for shipping or storage purposes. In order to further reduce the possibility of bruising by decreasing the free fall distance, momentum and impact force of the fruit pieces as described above, the end of the conveyor from which the fruit is discharged and the receptacle should be in close proximity to each other. In accordance with the invention described herein, a receptacle is positioned immediately adjacent to and under conveyor 22 by elevating the rear portion of the entire conveyor assembly and placing the receptacle under the conveyor. The conveyor assembly is elevated by actuation of hydraulic cylinder 8. As cylinder 8 expands, cross-support member 63 is raised. At the same time, bracket extensions 9 pivot about pins 62 causing roller 11 to move upwardly and rearwardly along elevation ramp guide 10. Movement of bracket extension 9 and cross-support member 63 causes elevation of the entire rear portion of the conveyor assembly. The degree of elevation is controllable by the extent of the expansion of hydraulic cylinder 8. The height to which the conveyor assembly is elevated is determined by the height and placement of the fruit receptacle. By elevating the entire conveyor, any type of receptacle can be used, including a box, a bin, a truck, etc. with minimum bruising since the receptacle will always be immediately adjacent to the conveyor.

While hydraulic power has been described for use with the invention herein, it is to be understood that any suitable source of power can be used, such as pneumatic, electric, etc. Also, the design of the assembly frame structure makes amenable the use of relatively inexpensive structural components.

The harvesting apparatus of this invention has several advantages over existing machinery. As explained previously, the deflector is designed to reduce the amount of bruised fruit. The elevation system also reduces the quantity of bruised fruit as well as permitting discharge of the fruit into a wide variety of receptacles. Since the conveyor is not directly driven by a sprocket, there are no metallic attachments on the belt itself thus reducing the frequency of repair as well as the quantity of bruised fruit. Several other advantages are apparent from the foregoing specification.

The invention has been described in detail with particular reference to certain preferred embodiments thereof, but it will be understood that variations and modifications can be effected within the spirit and scope of the invention.

I claim:
1. A fruit harvesting apparatus for receiving fruit shaken from a tree, including:
   a. an elongated framework;
   b. an elongated conveyor mounted in said framework, said conveyor serving to transport fruit to one end of said framework;
   c. a rotatable roll support member positioned above said conveyor;
   d. a flexible drape adapted to be rolled and unrolled for positioning on the ground under said tree to receive fruit shaken therefrom, one side of said drape being attached to said rotatable roll support member whereby as the roll support member is rotated, said drape is rolled up over said member thereby forming a roll; and
   e. deflector means supported by said framework and positioned in close proximity to the roll support member and in a manner whereby fruit conveyed on said drape by rotation of said roll support member is discharged onto said deflector means and thereafter discharged from said deflector means onto said conveyor which transports and ultimately discharges said fruit into a receptacle.

2. A fruit harvesting apparatus as described in claim 1 wherein said drape contains a slot extending inwardly from the side of said drape opposite from the side attached to said rotatable roll support member thereby permitting said drape to be extended about the base of a tree.

3. A fruit harvesting apparatus as described in claim 1 wherein said drape contains means forming a plurality of resilient cleats attached in spaced relation along the top of said drape.

4. A fruit harvesting apparatus as described in claim 1 wherein said deflector is padded with a resilient material.

5. A fruit harvesting apparatus as defined in claim 1 further including a drape support means forming an inclined planar surface extending from a position immediately adjacent and below said rotatable roll support member to a position in close proximity to the ground thereby providing support for said drape.

6. A fruit harvesting apparatus for receiving fruit shaken from a tree, including:
   a. an elongated framework having a fixed forward end and a vertically elevatable rear end;
   b. elevation means attached to the vertically elevatable rear end of the elongated framework;
   c. an elongated conveyor mounted in said framework in a manner whereby elevation of the rear of said framework causes elevation of said conveyor, said conveyor serving to transport fruit to one end of said framework and discharge said fruit into a receptacle;
   d. a rotatable roll support member positioned above said conveyor; and
   e. a flexible drape adapted to be rolled and unrolled for positioning on the ground under said tree to receive fruit shaken therefrom, one side of said drape being attached to said rotatable roll support member whereby as the roll support member is rotated, said drape is rolled up over said member thereby forming a roll.

7. A fruit harvesting apparatus as described in claim 6 wherein said drape contains a slot extending inwardly from the side of said drape opposite from the side attached to said rotatable roll support member thereby permitting said drape to be extended about the base of a tree.

8. A fruit harvesting apparatus as described in claim 6 wherein said drape contains means forming a plurality of resilient cleats attached in spaced relation along the top of said drape.

9. A fruit harvesting apparatus as described in claim 6 including a drape support means forming an inclined planar surface extending from a position immediately adjacent and below said rotatable roll support member to a position in close proximity to the ground thereby providing support for said drape.

10. A fruit harvesting apparatus as described in claim 6 wherein said elongated conveyor comprises an endless belt supported by rollers.

11. A fruit harvesting apparatus for receiving fruit shaken from a tree including:
  a. an elongated framework having a fixed forward end and a vertically elevatable rear end;
  b. elevation means attached to the vertically elevatable rear end of the elongated framework;
  c. an elongated conveyor mounted in said framework in a manner whereby elevation of the rear of said framework causes elevation of said conveyor, said conveyor serving to transport fruit to one end of said framework and discharge said fruit into a receptacle;
  d. a flexible drape adapted to be rolled and unrolled for positioning on the ground under said tree to receive said fruit shaken therefrom;
  e. a rotatable roll support member positioned above the conveyor;
  f. one side of said drape attached to the rotatable roll support member whereby as the roll support member is rotated, said drape is rolled up over said member thereby forming a roll; and
  g. deflector means positioned in close proximity to the roll support member and in a manner whereby fruit conveyed on said drape by rotation of said roll support member is discharged onto said deflector means and thereafter discharged from said deflector means onto said conveyor which transports and ultimately discharges said fruit into a receptacle.

12. A fruit harvesting apparatus as described in claim 11 wherein said drape contains a slot extending inwardly from the side of said drape opposite from the side attached to said rotatable roll support member thereby permitting said drape to be extended about the base of a tree.

13. A fruit harvesting apparatus as described in claim 11 wherein said drape contains means forming a plurality of resilient cleats attached in spaced relation along the top of said drape.

14. A fruit harvesting apparatus as described in claim 11 wherein said deflector is padded with a resilient material.

15. A fruit harvesting apparatus as described in claim 11 further including a drape support means forming an inclined planar surface extending from a position immediately adjacent and below said rotatable roll support member to a position in close proximity to the ground thereby providing support for said drape.

16. A fruit harvesting apparatus as described in claim 11 wherein said elongated conveyor comprises an endless belt supported by rollers.

17. A fruit harvesting apparatus as defined in claim 1 wherein said rotatable roll support member is positioned above and off center with relation to the conveyor.

18. A fruit harvesting apparatus as described in claim 11 wherein said rotatable roll support member is positioned above and off center with relation to the conveyor.

* * * * *